M. GOLEIN.
RESILIENT MATERIAL.
APPLICATION FILED APR. 7, 1919.

1,400,151.

Patented Dec. 13, 1921.

INVENTOR
Mark Golein,
BY Victor J. Evans
ATTY

UNITED STATES PATENT OFFICE.

MARK GOLEIN, OF BROOKLYN, NEW YORK.

RESILIENT MATERIAL.

1,400,151. Specification of Letters Patent. Patented Dec. 13, 1921.

Application filed April 7, 1919. Serial No. 287,981.

*To all whom it may concern:*

Be it known that I, MARK GOLEIN, a citizen of United States, residing at Brooklyn, in the county of Kings and State of New York, have invented new and useful Improvements in Resilient Materials, of which the following is a specification.

This invention relates to resilient material used for tread surfaces and has particular reference to use as an automobile tire.

One of the principal objects of the invention is the provision of an article of the class described which includes a metallic member having provided in its opposite surfaces a plurality of wells or depressions which are arranged in staggered relation to each other and which are adapted to receive a coating of elastic material.

Another object of the invention is the provision of an article of the class described which is of simple construction, inexpensive to manufacture and thoroughly reliable and efficient in the purpose for which it is intended.

With these and other objects in view the invention resides in the novel construction more fully pointed out in the following description and claims and illustrated in the accompanying drawings in which:

Figure 1:
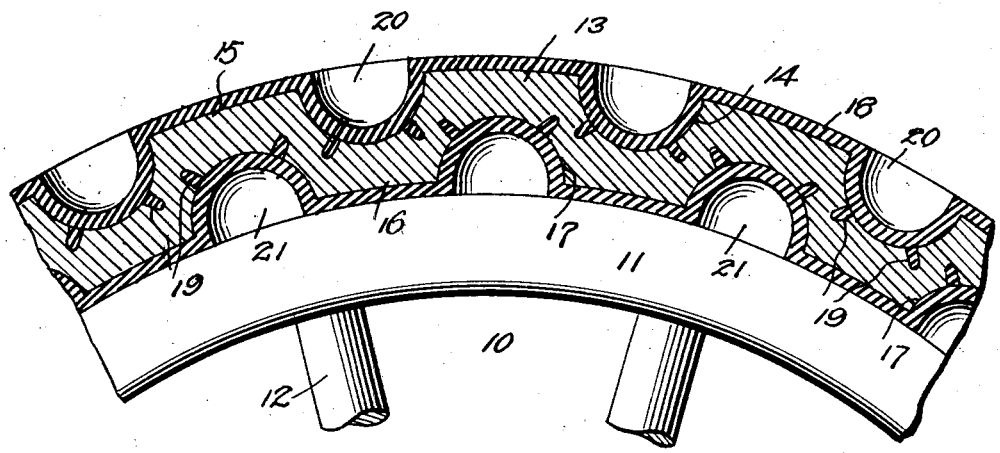
Figure 1 is a fragmentary view through a portion of a vehicle wheel showing the resilient material used as a tire or tread surface.
Figure 2:
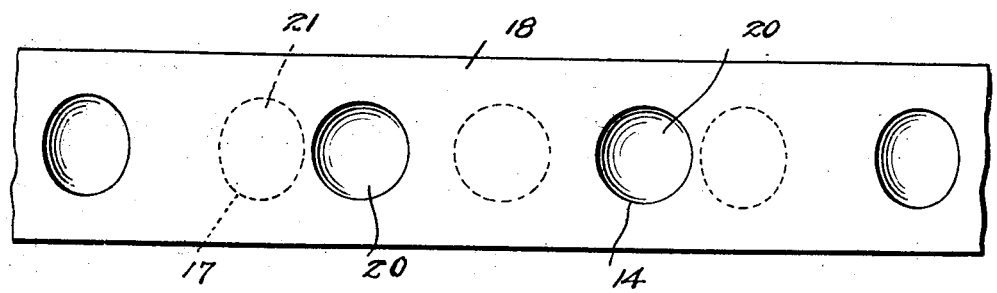
Fig. 2 is a plan view thereof.
Figure 3:
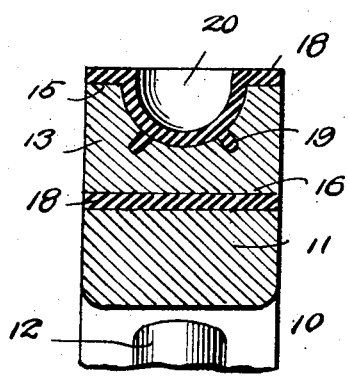
Fig. 3 is a cross sectional view therethrough.

Referring to the drawings by numerals 10 designates a wheel provided with the spokes 12 and the usual felly 11. The tire or tread consists of a metallic member 13 which is provided with the wells or depressions 14 on its outer surface 15. The inner surface 16 is also provided with the wells or depressions 17 and it will be seen from the drawings that the wells or depressions 17 are staggered with relation to the wells or depressions 14 in order to strengthen the structure. The surfaces of the metallic member 13 are then coated with an elastic material 18 and in order to more effectively secure the same to the metallic member the latter is provided with a plurality of spaced anchoring bores 19 in which the coating is received for securing the same to the member 13. When the elastic coating has been worn to an appreciable extent the metallic member is recoated in order to present a new surface. It will be noted that this formation provides the tread surface with a number of suction cups 20 which effectively co-act with the ground surface to prevent skidding when the device is applied to an automobile tire. It will also be further observed that the inner surface of the tread member is provided with a number of suction cups 21 which co-act with the felly of the wheel to prevent creeping of the tire thereon. The material is of a very resilient nature and acts effectively as a substitute for pneumatic tires and the like.

While the material is shown and described as a tread surface for automobile tires the same may be used as a buffer for vehicles, boats, railroad cars, corners of trunks or may be adapted for use as shoe soles and heels or in many other instances. I do not care to be limited to the exact details of construction or the use of the device but desire to reserve the right to make such changes and alterations as fall within the scope of the appended claims.

What is claimed as new is:

1. The combination with a vehicle wheel, of a rim comprising a metallic core having cup shaped depressions in its periphery, an elastic coating for said periphery, said coating extending into the depressions and providing suction cups.

2. The combination with a vehicle wheel, of a rim comprising a metallic core having cup shaped depressions in its periphery, anchoring bores extending within the core and connecting with the depressions and an elastic coating extending within said depressions to provide suction cups and entering the anchoring bores to secure the coating to the core.

In testimony whereof I affix my signature.

MARK GOLEIN.